United States Patent [19]

Dean

[11] 4,027,150
[45] May 31, 1977

[54] SAFETY LIGHT

[75] Inventor: David W. Dean, Southbury, Conn.

[73] Assignee: NBC Entertainment Corporation, Burbank, Calif.

[22] Filed: Nov. 15, 1974

[21] Appl. No.: 524,038

[52] U.S. Cl. .......................... 240/7.55; 240/10.66; 240/58; 240/90; 340/134
[51] Int. Cl. ............................................. B62j 5/00
[58] Field of Search ............ 240/6.4 R, 6.42, 7.55, 240/8.1 A, 10.6 R, 10.66, 10.68, 57, 58, 67, 84, 90; 340/134

[56] References Cited

UNITED STATES PATENTS

| 2,125,038 | 7/1938 | Tompkins et al. | 240/10.66 |
|---|---|---|---|
| 2,522,189 | 9/1950 | Morrow | 240/8.1 A |
| 2,681,433 | 6/1954 | Palmer | 240/10.66 X |
| 2,681,979 | 6/1954 | Manoloff | 240/10.68 X |
| 2,753,439 | 7/1956 | Greenfield | 240/57 X |
| 2,790,157 | 4/1957 | Guest et al. | 240/7.55 X |
| 2,889,449 | 6/1959 | Faloon | 240/6.42 |
| 3,239,829 | 3/1966 | Cline et al. | 240/68 X |
| 3,369,116 | 2/1968 | Klingle | 240/8.1 A |
| 3,578,964 | 5/1971 | Sherman | 240/8.1 A |
| 3,696,334 | 10/1972 | Demeter | 240/7.55 |
| 3,890,497 | 6/1975 | Rush | 240/7.55 |

FOREIGN PATENTS OR APPLICATIONS 827,177  4/1938  France ............................. 340/134

Primary Examiner—L. T. Hix
Assistant Examiner—Alan Mathews
Attorney, Agent, or Firm—Stephen E. Feldman

[57] ABSTRACT

A bicycle safety light positioned on a bike pole including a dome shaped cover, which is translucent and of a color to emit light distinguishable for vehicle safety purposes. The dome is mounted on a removable base adapted to receive a battery case on which is mounted a blinking light bulb and on/off switch. When installed in the base the bulb is housed within the dome shaped cover and the switch is easily accessible to actuate the bulb; batteries are disposed vertically in the battery case which is separately removable. A reducer permits attachment of the cover, batteries and battery case combination to an extender (bike pole) the other end of which is affixed to a mounting bracket to facilitate mounting the safety light on a bicycle, motorcycle or the like. An opening in the reducer permits access to the off/on switch. The dome may be vertically adjustable to change its position with respect to the bulb.

21 Claims, 8 Drawing Figures

U.S. Patent   May 31, 1977   Sheet 1 of 3   4,027,150
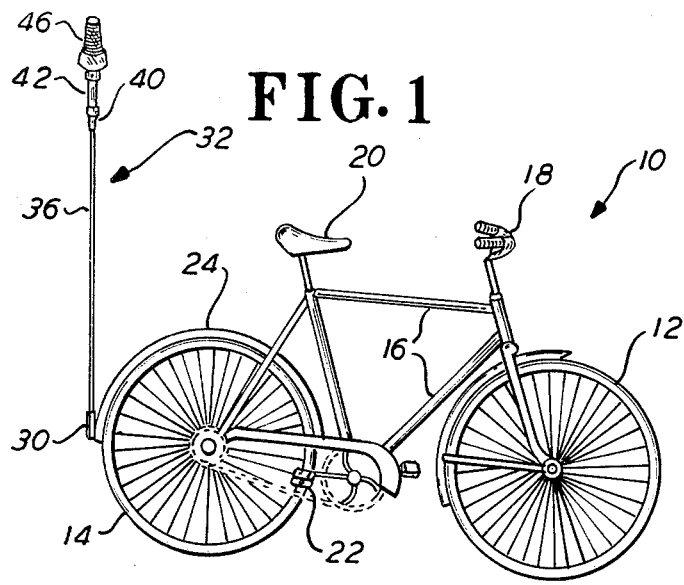
FIG. 1
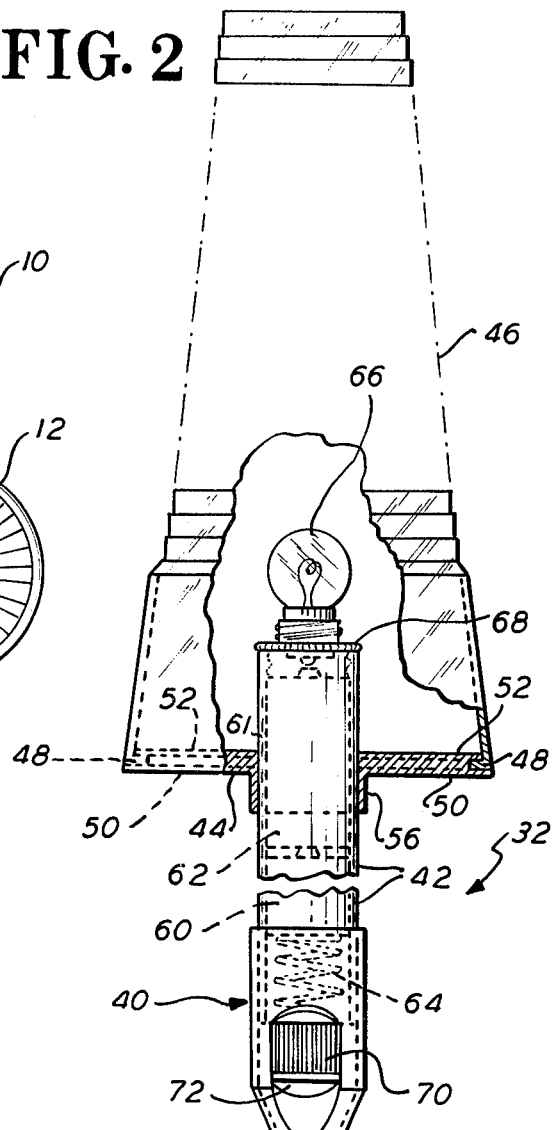
FIG. 2
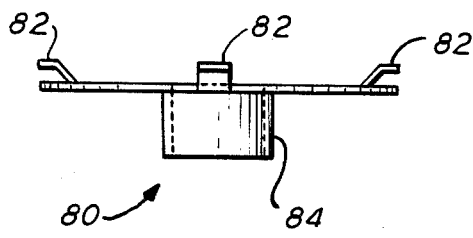
FIG. 3
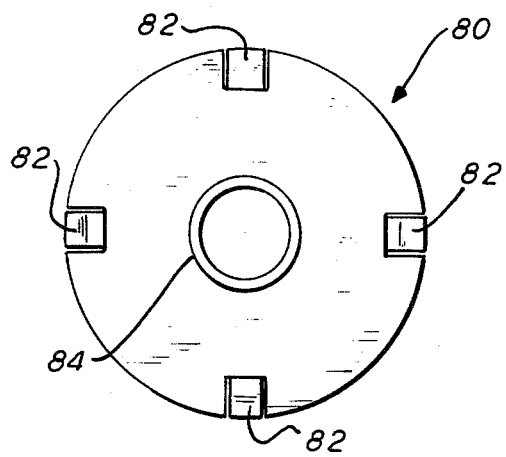
FIG. 4
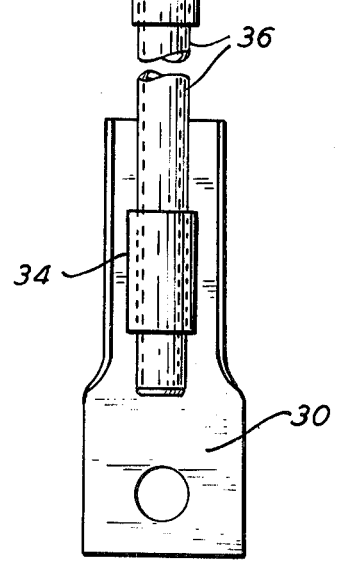

FIG. 5
FIG. 6
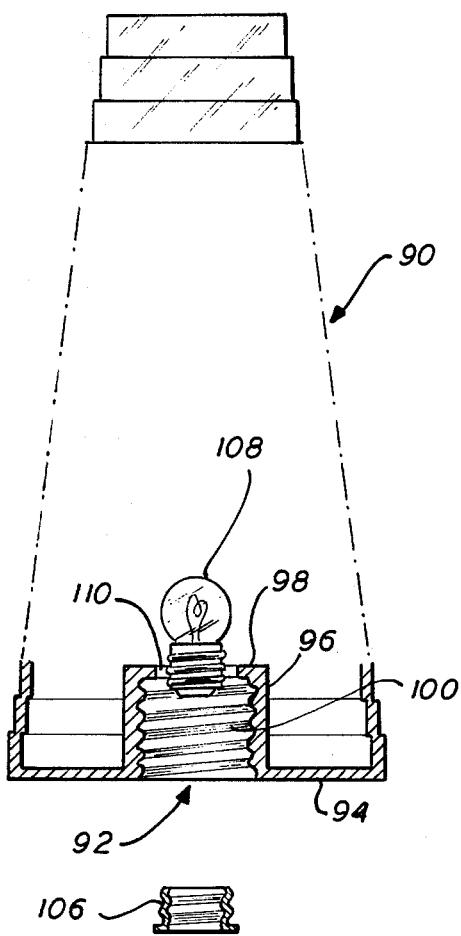
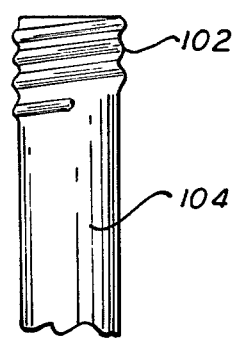
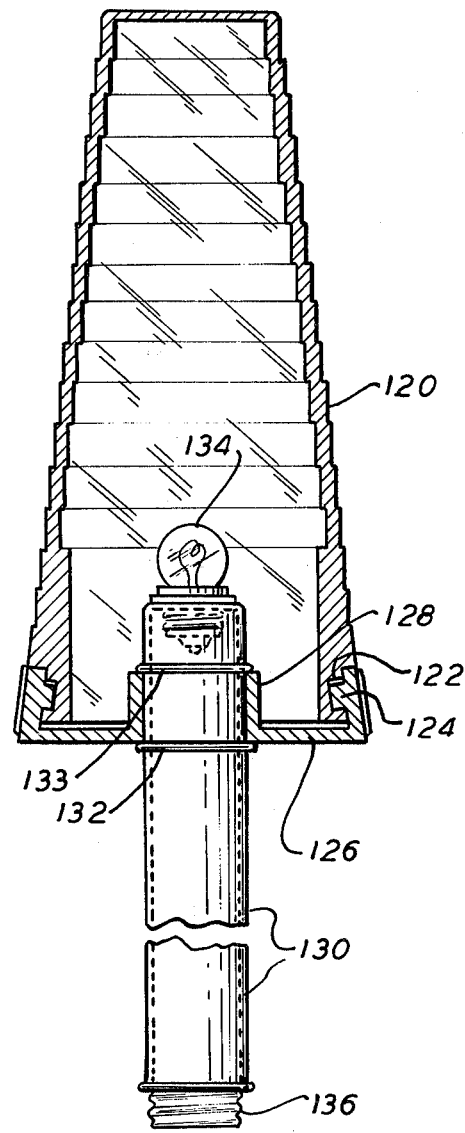
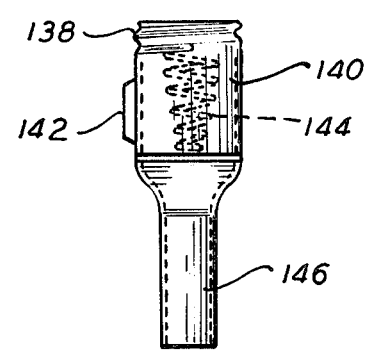

SAFETY LIGHT

BACKGROUND OF THE INVENTION

1. Field of the Application.

This invention relates to safety lights and more particularly to safety light for vehicles such as bicycles, motor cycles and the like.

2. Description of the prior art

Most bicycles and motorcycles, are required by law to display appropriately colored safety lights proximate to their rearmost extremety. The light is usually mounted on a rear fender or brakcet disposed in proximity to the rear wheel. As such, safety lights are generally displayed in a relatively low position and may not be seen by a following vehicle in time to avoid an accident when used at night.

Some prior art devices attempt to cure the low profile safety warning device problem by providing high profile type devices for attracting the eye of the driver of the vehicle which is following. However, some of such devices while pleasing to the eye, such as shown in U.S. Pat. No. 3,812,815, granted on May 28, 1974 to Robert M. Kuenzel, lack proper night illumination. Other high profile devices area available which provide for proper night illumination but these are either relatively complex with many parts (including moveable parts) such as shown in U.S. Pat. No. 3,099,234, granted on July 30, 1963 to L. R. Schwartz et al, and U.S. Pat. No. 3,696,334 granted on Oct. 3, 1972 to John C. Demeber; or they require separate sources of power, as shown in U.S. Pat. No. 3,683,842 granted to Kenneth G. Logan and thus, fail to deal at all with the problem of vehicles such as bicycles which do not possess a ready source of electrical power.

In providing an effective high profile safety device it is important to make the device as simple in construction and operation as possible. The more complex the construction, the more expensive the cost; the more expensive the cost, the greater number or persons denied the opportunity to use a proper high profile safety device. If the operation of the device is complex its use will be avoided and the purpose of the device defeated.

On the other hand, the device should not be so simple in construction and attachment that battery and bulb replacement becomes a problem, or that theft and its attendant expense becomes a reason for not using the device.

SUMMARY OF THE INVENTION

It is therefore an object of the invention to provide a new and improved safety light.

It is another object of this invention to provide a new and improved safety light for a vehicle such as a bicycle, motorcycle and the like.

It is a further object of this invention to provide a new and improved high profile safety light.

It is yet another object of this invention to provide a new and improved dome shaped cover, base and case for mounting batteries, a bulb and an on/off switch in combination to form a safety light.

It is yet still another object of this invention to provide a new and improved battery case/light emitting -cover, extender/mounting bracket assembly to form a high profile safety light.

The invention involves a safety light mounted on a bike pole including a dome shaped cover for emitting colored light, a flanged base attached to the cover to secure the light to a battery case. A blinking actuatable by an on/off switch disposed on the case. The dome is vertically adjustable to position the bulb at varying positions within the dome. The base/battery case is removeable to provide for easy replacement of the bulb and batteries. An attaching device is provided to connect the battery case to an elongated extender member (bike pole), a mounting bracket disposed at the other end of the extender member to permit attachment of the device to the carrying vehicle.

Other objects, features, and advantages of the invention in its details of construction and arrangement of parts will be seen from the following description of the preferred embodiment when considered in conjuction with the drawings and the appended claims.

BRIEF DESCRIPTION OF THE DRAWINGS

FIG. 1 is a schematic perspective view of a bicycle to which is attached a high profile safety device incorporating the instant invention.

FIG. 2 is an elevational view, of the safety device, extender and mounting bracket of FIG. 1 removed from the bicycle and cut away in part to better show details thereof.

FIG. 3 is a side elevational view of a modified form of base for the safety light of FIGS. 1 and 2.

FIG. 4 is a plan view of the base of FIG. 3

FIG. 5 is a sectional view of a modified light cover, battery case and bulb assembly incorporating the instant invention.

FIG. 6 is a sectional view of yet another modified light cover, battery case, and bulb assembly incorporating the instant invention.

Figure 7:
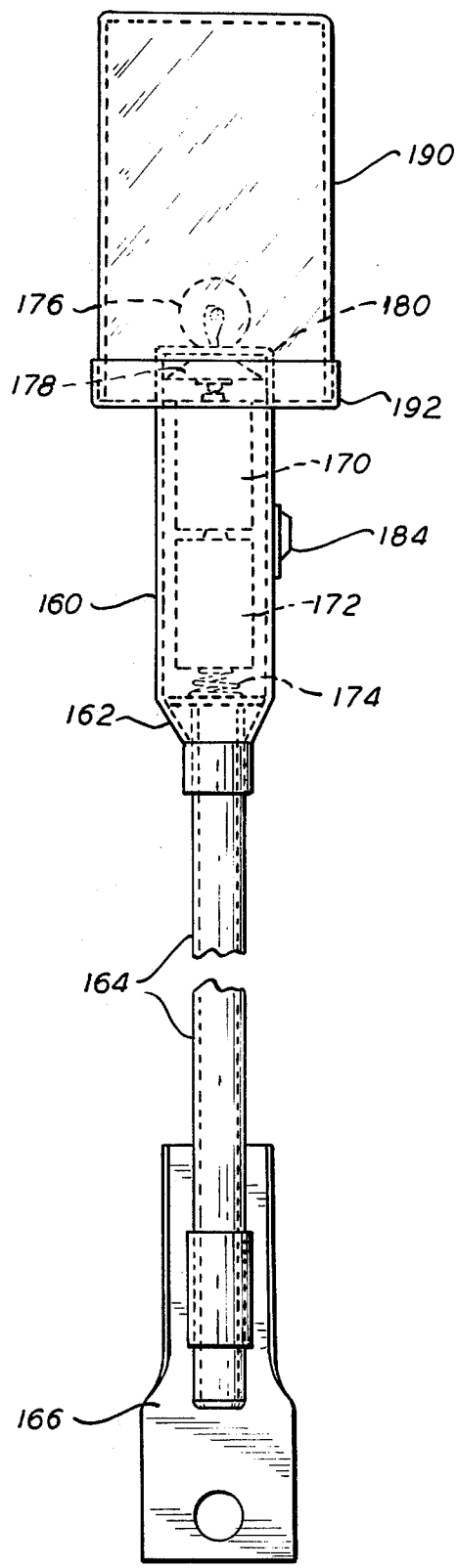
FIG. 7 is an elevational view of still another modified form of high profile safety light incorporating the instant invention.

DESCRIPTION OF THE PREFERRED EMBODIMENT.

For convenience, the invention will be described as applied to a high profile safety light which is attached to a bicycle by means of a long thin bike pole. The light, which utilizes a translucent colored dome type cover, in the shape of a cone fitted to a base includes a blinking light bulb disposed on top of a battery case, the latter being adapted to house 2 pen light type AA batteries. It is understood, nevertheless, that without departing from the scope of the invention, the vehicle could be a motorcycle or the like. The light cover can be transparent as well as translucent. The cover can be any appropriate color and shape. The battery case can be sized to receive either one or more batteries which can be any tupe (A, B, C, D, etc.). Further, an adapter may be provided to mount the battery case onto a rod-like element which is either the same diameter or smaller than the battery case.

With reference to FIG. 1 there is generally shown at 10 a conventional bicycle having a front wheel 12, a rear wheel 14, a frame 16, handle bars 18, a seat 20, drive means 22 and front and rear fenders 23 and 24.

The light of the invention may be attached to a rear portion of the bicycle such as to fender 24, to the hub 15 of rear wheel 14 or to any other appropriate part of the bicycle. Bracket 30 is a thin flat member having an opening 31 for attaching the member to the bicycle. Bracket 30, or other suitable connecting means is provided to attach the light to the bicycle. It has a raised cylindrical holder 34 (FIG. 2) adapted to receive an extender member 36 (FIGS. 1 and 2) of elongated rod-like configuration. Extender member 36 is preferably a long, thin flexible tubular member but may just as easily be of solid metal or tubular or rod plastic having suitable strength characteristics. The holder 34 is preferably of a diameter only slightly larger than the diameter of extender member 36 so as to functionally hold the member securely in position by means of an interference fit. If desired, other securing means, such as a screw could be provided.

Adapter 40 is positioned atop extender 36. The adapter is cylindrical in configuration, having a smaller diameter lower section 39 which securely fits on extender 36 and a larger diameter upper section 91 which is of a diameter sufficiently large to accomodate cylindrical battery case 42. Battery case 42 is shown formed from tubular metal, but other suitable materials or configurations may be used just as well. A flange 44 which functions as the light base, is positioned on said battery case. The dome cover 46, which is of truncated conical shape with an open top, is made of translucent material, preferably plastic, and of a bright color such as red or orange, corresponding to that usually used for safety lights. The conical shape of the cover may include a series of bands of reduced circumference to produce an outer surface of step-like configuration. This surface will tend to produce superior lighting characteristics. Other colors and materials and shapes may be used for cover 46. An extending shoulder 48 on the cover (FIG. 2) surrounding its bottom forms a snap fit with a pair of spaced parallel ribs 50, and 52 circumferentially formed on the outer edge of light base 44. The opening in the top of the cover is provided for heat dissipation.

An annular boss 56, centrally disposed on light base (flange) 44, is adapted to secure the light base to battery case 42. Initially the fit between the outside diameter of battery case 42 and the inner diameter of boss 56 is such as to permit relative sliding motion therebetween. However, when battery case 42 and light base 44 are properly positioned with respect to each other, and to the users liking, boss 56 is pinned in place to secure it to the battery case 42. Alternatively, it can be fastened in any other appropriate manner. Further, if desired, the light base and battery case are just snugly fitted together and not permanently secured. In this case, the light base will be slidable up and down the battery case to position the light bulb at various vertical locations within the cover.

Battery case 42 accomodates two type AA batteries, 60 and 62, disposed one on top of the other and biased by a spring 64 into contact with the base of a light bulb 66. Bulb 66 is a conventionally available flash light type bulb which blinks when energized. It is screwed into a bulb adapter 68 which is, in turn, screwed into the top of battery case 42. If desired, an ordinary, non-blinking bulb can be used. However, in that case, a suitable blinking mechanism may be provided.

At the base of battery case 42 there is provided a conventional rotary type switch 70 which when rotated in one direction will turn bulb 66 on and when rotated in the other direction or further rotated in the same direction, will turn bulb 66 off. An appropriate elongated aperture 72 is formed in adapter 40 to expose and permit access to switch 68.

In utilizing safety light 32 one need only rotate switch 68 to turn on bulb 66 and provide a blinking orange safety signal.

Replacement of bulb 66 or batteries 60 and 62 is easily accomplished by snapping cover 46 off of light base 44. Bulb 66 is then unscrewed if it needs replacement or both bulb 66 and bulb adapter 68 are unscrewed if batteries 60, 62 need replacement. The batteries are removed by bending extender member 36 in an arcing manner so that the batteries slide out. Battery case 42 can also be removed from adapter 40 and the batteries removed from that end of the battery case. Alternatively, a cylindrical sheath 61 may be positioned around batteries 60 and 62. The sheath is made of a flexible plastic material which resiliently grasps the batteries. The batteries and sheath now form somewhat of an integral unit so that when either the top battery 62 or the sheath is removed the entire unit will be removed.

After such replacement, cover 56 is snapped back onto light base 44. The replacement is thus accomplished without removing the device from the bicycle.

Extender rod 36 may be selected to any particular height keeping in mind that the purpose thereof is to put safety light 32 in plain view of a following motorist or cycle.

A modified light base 80 is shown in FIGS. 3 and 4 to use with the light of FIG. 2 in place of light base 44. Light base 80 has four projecting tabs 82 raised therefrom to receive shoulder 48 (FIG. 2) of cover 46. An annular boss 84 is formed centrally on the light base to receive battery case 42 in the same manner as boss 56 of FIG. 2.

In FIG. 5 there is shown a combined cover and light base 90 formed as an integral unit for use with the configuration of FIGS. 1 and 2 in place of the cover and base shown therein. A cylindrical recess 92 is centrally formed in the bottom 94 of cover 90 with threaded walls 96 and a top 98. The battery case 104 used with this embodiment is the same as the one used for the embodiment of FIGS. 1 and 2, except that the upper end is threaded at 112 to screw into the threads on wall 96. A threaded bulb holder 106 receives bulb 108 which is adapted to extend up through a hole 110 formed in top 98.

When either the batteries (not shown) in battery case 104 or bulb 108 needs replacement one need only unscrew cover 90 to separate threads 100 formed therein from threads 102 on battery case 104. Bulb holder 106 and bulb 108 will then drop down with bulb 108 easily passing through hole 110. After the batteries or bulb 108 are replaced, bulb 108 and bulb holder 106 are again positioned atop battery case 104 and cover 90 screwed back in place thereon.

The embodiment of FIG. 6 illustrates a light cover 120 which is similar to that of FIG. 2 including top opening 121. A circumferential groove 122 is positioned proximate the lower end of the cover.

The light base used in conjunction with this configuration includes an upstanding lip including an inwardly extending rib 124. The rib snaps into groove 122 on cover 120 to hold the cover to the base. However, this light base also has a centrally disposed integrally extending cylindrical wall 128. The battery case 130 for this embodiment is cylindrical and similar to the one of FIG. 2.

The case 130, which is adapted to receive two batteries (not shown) one on top of the other, has formed on its outer periphery, proximate the top thereof, a pair of spaced ridges 132 and 133. These ridges are positioned so that wall 128 fits between them, when the battery case is placed through the opening in the cylindrical wall to secure the battery case to the light base. The upper end of the battery case is rounded and has an opening therein into which a bulb holder 131 is placed. The holder, which is threaded, is attached to the battery case by a brass or aluminum threaded insert. A bulb 134 is placed in the bulb holder. The bulb may be replaced upon removal of cover 120 from the light base.

In this embodiment, battery replacement is accomplished by separation of threads 136 formed proximate the bottom of battery case 130 from a series of threads 138 formed internally within an adapter 140. This adapter is similar in configuration to adapter 40 of the embodiment of FIG. 2, however, it contains the internal threads and also houses a sliding type on/off switch 142. In a similar manner to FIG. 2, a spring 144 is provided for urging the batteries into contact with bulb 134. Also the lower end 146 of adapter 140 is formed to receive a tubular or rod-like extender member, (which is the same as member 36 of FIG. 1), and mounting bracket (not shown) for use in securing the safety light of FIG. 6 of a bicycle.

Figure 8:
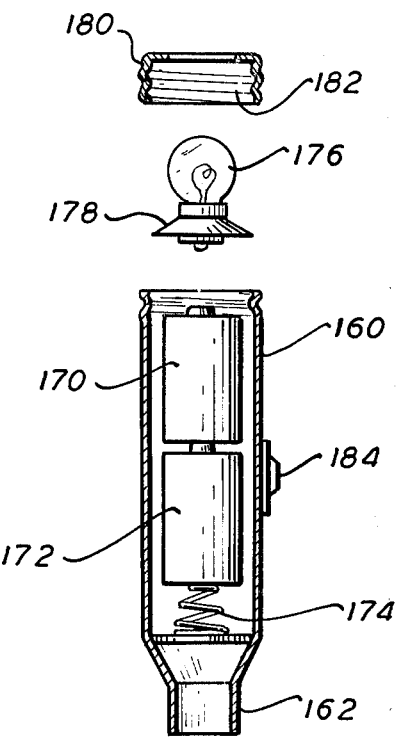
FIG. 8 is a sectional and partially exploded view of the battery case of FIG. 7

In the embodiment of FIGS. 7 and 8, the adapter 40 and battery case 42 are formed into one unit. Battery case 160 is shown having an adapter end 162 formed thereon to receive a tubular or rod-like extender 164 carried by a mounting bracket 166. This extender and mounting bracket are the same as in FIG. 2. Battery case 160 (FIGS. 7 and 8) has two batteries 170 and 172 positioned one on top of the other, with a spring 174 urging the batteries 170 and 172 into contact with a bulb 176.

Bulb 176 is screwed into a circular concave reflector 178 (FIG. 8) and is held in place atop battery case 160 by a cylindrical cap 180 which is provided with internal threads 182 for easy assembly with and removal from battery case 160. A hole is located in the cap through which the bulb projects when the parts are assembled. A sliding type on/off switch 184 is provided on the side of the battery case for actuating the light bulb.

A cylindrical light cover 190, closed at the top and open at the bottom, similar to that of FIG. 1 is provided. The light cover in this embodiment however, snaps into a disk shaped light base 192. Light base 192 fits snugly about battery case 160.

From the above description it will thus be seen that there has been provided a novel and improved safety light which may be mounted atop a rod for a high profile type light. It also may be mounted directly to the vehicle if so desired. The light is simple in construction and permits easy replacement of batteries and bulbs. A battery operating switch is disposed for easy access on the battery case. An adaptor either formed at the bottom of the battery case or attachable therewith facilitates mounting atop a rod. The light is suitable for bicycles, motorcycles, and other vehicles including, for example, ski mobiles.

It is understood that although I have shown preferred forms of my invention that various modifications may be made in the details thereof without departing from the spirit and scope of the invention.

I claim:
1. A safety lamp for a vehicle comprising:
power case means adapted to contain a source of power and adapted to actuate a light bulb when the bulb is disposed proximate a first end of said power case means;
light cover means attachable to said first end of said power case means to enclose a light bulb disposed proximate thereto;
said light cover means constructed of a material permitting light from the light bulb when illuminated to pass therethrough;
a second end of said power case means extending outwardly and away from said light cover means;
an elongated extension means being at least as long as said power case means and connectable to the second end thereof;
a mounting bracket means connected to said elongated extension means adapted to secure said safety lamp to a vehicle;
on/off switch means carried by said power case means for movement between an off position and an on position to complete an electrical circuit to the light bulb;
said switch means being of a rotary type and being disposed proximate said second end of said power case means;
an adapter disposed proximate said second end of said power case means and about said switch means; and
aperture means formed in said adapter to facilitate access to said switch means;
said adapter connecting said elongated extension means to said power case means.
2. A safety lamp for a vehicle comprising:
power case means adapted to contain a source of power and adapted to actuate a light bulb when the bulb is disposed proximate a first end of said power case means;
light cover means attachable to said first end of said power case means to enclose a light bulb disposed proximate thereto;
said light cover means constructed of a material permitting light from the light bulb when illuminated to pass therethrough;
a second end of said power case means extending outwardly and away from said light cover means;
an elongated extension means being at least as long as said power case means and connectable to the second end thereof;
a mounting bracket means connected to said elongated extension means adapted to secure said safety lamp to a vehicle;
on/off switch means carried by said power case means for movement between an off position and an on position to complete an electrical circuit to the light bulb;
said switch means being disposed proximate said second end of said power case means;
an adapter disposed proximate said second end of said power case means and about said switch means; and
aperture means formed in said adapter to facilitate access to said switch means;
said adapter connecting said elongated extension means to said power case means.
3. The lamp of claim 2 wherein said elongated extension means is of a different size from that of said power case means and said adapter is inserted between said elongated extension means and said second end of said power case means to interconnect same and accomodate said size differential.

4. The lamp of claim 3 wherein both said power case means and said elongated extension means are cylindrical and said difference in size is a difference in diameter.

5. The lamp of claim 4 wherein said power case means is adapted to house electric battery means.

6. The lamp of claim 5 wherein said battery means includes two electrical batteries disposed in end to end relationship.

7. The lamp of claim 2 including on/off switch means carried by said power case means for movement between an off position and an on position to complete an electrical circuit to the light bulb.

8. The lamp of claim 7 wherein said switch means is a rotary type and is disposed proximate said second end of said power case means.

9. The lamp of claim 7 where said switch means is a sliding type.

10. The lamp of claim 2 wherein said material of said light cover means is translucent.

11. The lamp of claim 10 wherein said cover is orange.

12. The lamp of claim 2 wherein said light cover means is cone shaped.

13. The lamp of claim 2 wherein said light cover means is cylindrical in shape.

14. The lamp of claim 2 wherein said light cover portion and light base portion are separably connected.

15. The lamp of claim 14 wherein said light base portion includes a centrally disposed cylindrical elongated boss adapted to receive said first end of said power case means.

16. The lamp of claim 15 wherein said light cover base portion and power case means are secured together.

17. The lamp of claim 2 wherein said light cover means covers a threaded recess means formed therein to threadably receive said first end of said power case means, which is formed with external threads thereabout and an aperture means in said recess means to permit insertion of the light bulb into said light cover means.

18. The lamp of claim 2 wherein the light bulb when installed therewithin and illuminated, blinks on and off.

19. A safety lamp for a vehicle comprising:
power case means adapted to contain a source of power and adapted to actuate a light bulb when the bulb is disposed proximate a first end of said power case means;
light cover means including a light cover portion and a light base portion which are connected together and which are constructed of a material permitting light from the light bulb when illuminated to pass therethrough;
said light base portion being furthermore formed to receive therethrough said first end of said power case so that when a light bulb is disposed proximate thereto the light bulb is positioned within said light cover portion;
a second end of said power case means extending outwardly and away from said light cover base portion;
a mounting bracket means connected to said second end of said power case means and adapted to secure said safety lamp to a vehicle;
said mounting bracket means being connected to said second end of said power case means by an elongated extension means which is at least as long as said power case means and is connectable to said second end thereof; and
on/off switch means directly attachable with said power case means so as to be readily separable therefrom to permit access into said power case means and arranged for movement between an off position and an on position to complete an electrical circuit to the light bulb, and including electrical conductor means for completing said electrical circuit.

20. The lamp of claim 19 wherein said switch means has a first end connectable with and separable from said electric power case means and a second end adapted to be connected to the elongated extension means.

21. A safety lamp for a vehicle comprising:
power case means adapted to contain a source of power and adapted to actuate a light bulb when the bulb is disposed proximate a first end of said power case means;
light cover means including a light cover portion and a light base portion which are separably connected together and which are constructed of a material permitting light from the bulb when illuminated to pass therethrough;
said light base portion being furthermore formed to receive therethrough said first end of said power case so that when a light bulb is disposed proximate thereto the light bulb is positioned within said light cover portion;
a second end of said power case means extending outwardly and away from said light cover base portion;
a mounting bracket means connected to said second end of said power case means and adapted to secure said safety lamp to a vehicle;
said mounting bracket means being connected to said second end of said power case means by an elongated extension means which is at least as long as said power case means and is connectable to said second end thereof;
said light base portion including a centrally disposed cylindrically elongated boss adapted to receive said first end of said power case means; and
said power case means is provided with annular spaced ribs disposed thereabout proximate said first end adapted to receive in close proximity therebetween said cylindrically elongated boss.

* * * * *